United States Patent [19]

Propster et al.

[11] Patent Number: 4,565,676

[45] Date of Patent: Jan. 21, 1986

[54] METHOD FOR TREATING EXHAUST GASES

[75] Inventors: Mark A. Propster, Granville; Subhash Kithany, Columbus; Stephen Seng, Frazeysburg, all of Ohio

[73] Assignee: Owens-Corning Fiberglas Corporation, Toledo, Ohio

[21] Appl. No.: 672,755

[22] Filed: Nov. 19, 1984

[51] Int. Cl.$^4$ ............... B01D 47/00; B01J 8/00; F01N 3/10
[52] U.S. Cl. .................. 423/210; 423/245; 422/175; 422/178
[58] Field of Search ....... 423/295 S, 210 C, DIG. 15; 422/175, 178

[56] References Cited

U.S. PATENT DOCUMENTS

| | | | |
|---|---|---|---|
| 1,874,985 | 8/1932 | Hardinge | 241/70 |
| 2,685,343 | 8/1954 | Permann | 423/210 C |
| 3,708,266 | 1/1973 | Gustavsson | 423/DIG. 15 |
| 4,043,019 | 8/1977 | Schröder | 241/23 |
| 4,076,504 | 2/1978 | Oshida et al. | 423/210 C |

*Primary Examiner*—Gregory A. Heller
*Attorney, Agent, or Firm*—Ronald C. Hudgens; Patrick P. Pacella

[57] ABSTRACT

A process for cleaning and incinerating the exhaust gases from a manufacturing process or a curing oven is disclosed. The invention uses heat transfer media and additional hot gases to scrub organic or condensate from the gases. The gases typically are from the curing of binder compositions or phenolic resins. The binders generally have been applied to a collected mat of glass fibers.

14 Claims, 2 Drawing Figures

METHOD FOR TREATING EXHAUST GASES

TECHNICAL FIELD

This invention relates to a process for cleaning and incinerating the exhaust gases from a manufacturing process such as a curing oven. More specifically, we employ durable, heat transfer media and additional hot gases to remove organic material and condensate from the gases.

BACKGROUND ART

Methods are known in the art for glass manufacturing wherein glass-forming batch ingredients are compacted into agglomerates and then are dried and heated in a chamber by a direct contact with flue gases from a glass melting furnace so as to produce free-flowing agglomerates which are then conveyed and discharged to the glass melting furnace.

Methods are also known in the art for preheating glass batch which include the steps of feeding cold particulate glass batch raw materials into one end of a rotating heat-transfer drum and feeding hot media of larger particle size than the batch particles into the other end of the heat transfer drum. The glass batch moves in direct and immediate physical contact with the heated media, with the batch flowing from the cold end to the hot end of the drum and the media flowing from the hot end to the cold end of the drum. The heat transfer media is made of a durable material such as ceramic material, steel, stainless steel, aluminum or gravel.

Phenolic resinous condensation products, and more specifically, phenol-formaldehyde resins, processes for their production and equipment for manufacture thereof are well known. Commercially, two main types of reactions involving different ratios of phenol to formaldehyde with acid and alkaline catalysts, respectively, are employed to produce commercially important curable phenol-formaldehyde resins. Through use of various reactants, catalysts, and proportions of each, and control of reaction conditions and the like, curable resins of different properties and types are obtained. In the presence of basic catalysts, such as sodium hydroxide, calcium hydroxide, tertiary amines, ammonia and the like, and more than one mole of formaldehyde per mole of phenol, phenol and formaldehyde condense to form a phenolic resole or an A-stage resin which is fusible and soluble in alkalis. Such resoles, upon further advancement of the reaction, proceed to a B-stage, where they are called resitols. Upon still further advancement of the reaction, they proceed to resites or C-stage resins, which are relatively insoluble and infusible products.

The binder composition can be embodied in the usual manner for the fabrication of structural tile, bonded insulation or pipe wrap, as by flooding a collected mat of glass fibers and draining off the excess or by applying the binder composition onto the glass fibers during mat formation. For cure, the mass is heated to a temperature in excess of 350° F., and preferably within the range of 500°-650° F. for a time sufficient to advance the components. The time and temperature will depend in part on the amount of binder in the final structure and the thickness and density of the structure that is formed. For a structure having a thickness ranging from ½ to 1 inch, a time ranging from 1-5 minutes will be sufficient at a temperature within the range of 500°-600° F.

The means by which the glass fibers are formed for use in the described system may vary widely. Use can be made of discontinuous or staple glass fibers such as are formed by the rapid attenuation of multiple streams of molten glass by high pressure streams of air or steam directed angularly downwardly onto the streams of molten glass flowing therebetween. Instead, use can be made of continuous or textile fibers such as are formed by the rapid attenuation of molten streams of glass. The continuous glass fibers may be employed in the form of mats fabricated thereof as by swirling the endless filaments or strands of continuous fibers, or they may be chopped or cut to shorter lengths for mat or batt formation.

DISCLOSURE OF THE INVENTION

According to this invention, we have developed a process for cleaning and incinerating the exhaust gases from a curing oven. We employ durable heat transfer media which are formed into a vertical packed bed. The exhaust gases from the curing oven are discharged into the lower portion of the bed and move upwardly through the bed. Hot exhaust gases are discharged into the intermediate portion of the bed and move upwardly incinerating any particulate, organic, or condensate in the exhaust gases from the curing oven. The media move downwardly through the bed in direct contact with and countercurrently to the flow of gases. The gases contact media in the upper portion of the bed and preheat the media, whereas the lower portion of the bed the media preheats the oven gas prior to incineration.

In another embodiment, the hot gases may be discontinued and the media may be used to clean the gases from the curing oven by countercurrent flow and collecting any condensate on the media.

In still another embodiment, the coated media is removed from the lower part of the bed and introduced into a cleaning drum before being recycled back to the top part of the bed.

BEST MODE OF CARRYING OUT THE INVENTION

Generally, this invention is employed in a manufacturing facility which has a process exhaust requiring incineration of fumes. A shaft type hopper maintains a vertical bed of media with the hopper preferably containing an upper substantially cylindrical portion and a lower inverted frustoconical portion.

Durable heat transfer media formed of glass batch agglomerates, glass, ceramic, steel, stainless steel, aluminum, gravel or the like may be used in this process. Alumina spheres have been found to be particularly useful. This material has shown very good results as the heat transfer media for preheating glass batch; its thermal and mechanical properties are excellent. Glass ceramic materials such as spodumene also may be used in the process.

Figure 1:
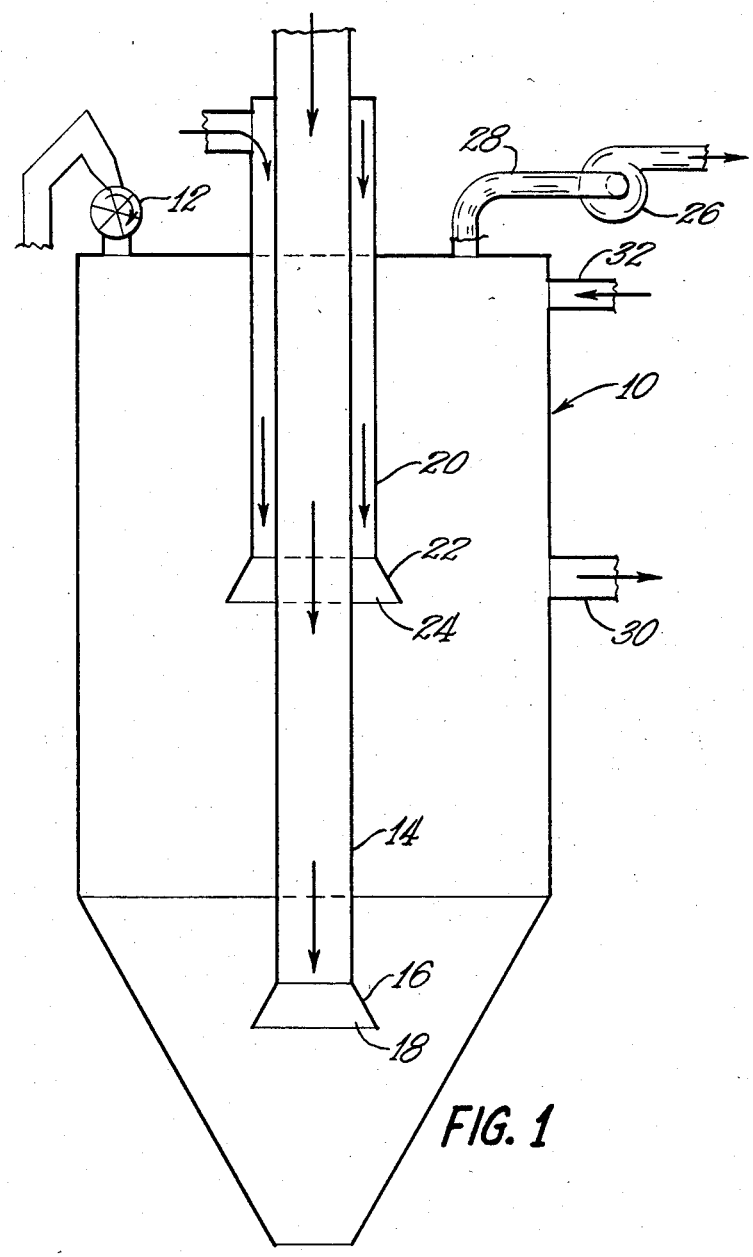
FIG. 1 illustrates the apparatus for carrying out the process of this invention.

In FIG. 1, media (not shown) is continuously fed to the top of hopper 10 by rotary feeder 12. Internal gas conduit 14 extends into the lower portion of hopper 10. Preferably, conduit 14 extends into the lower portion of the cylindrical portion or into the frustoconical portion, the latter being shown. Conduit 14 terminates in truncated cone 16 having open end 18.

Gas conduit 20 circumscribes conduit 14 and terminates in the intermediate portion of hopper 10. Generally, this location will be in the central region of the cylindrical portion of hopper 10. Conduit 20 terminates in a truncated cone 22 having open end 24. A blower or fan 26 is employed to pull exhaust gases from hopper 10 via conduit 28 or to maintain a negative pressure in the hopper.

Optional by-pass conduit 30 may be employed to reduce gas velocity or temperature at the bed exit. The by-pass provides a means for controlling and lowering the temperature in the hopper and also reducing superficial gas velocity at the top of the bed.

Conduit 32 may provide optional dilution air to control opacity in the gases vented to the atmosphere.

Figure 2:
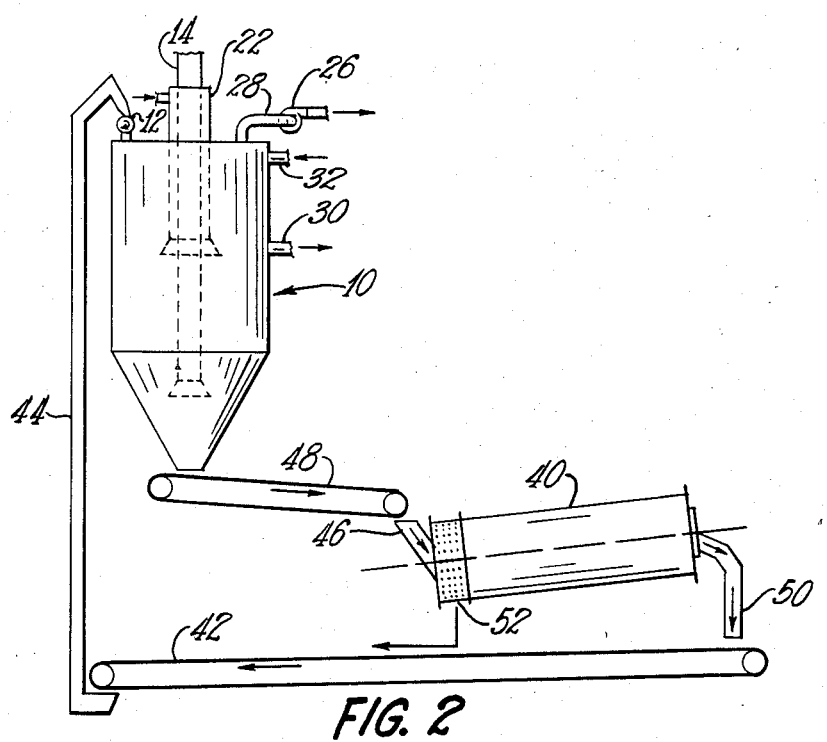
FIG. 2 illustrates the embodiment of employing a cleaning drum and recycling the media back to the bed.

FIG. 2 shows hopper 10 with cleaning drum 30 and recycling conveyors 42 and 44. Media is fed to drum 40 through conduit 46 via conveyor 48. Media leaves drum 40 via conduit 50. The rotation of the drum and baffles (not shown) causes the media to tumble in direct immediate physical contact with each other. Drum 40 may be inclined at an angle with the media charging end lowered below the media removal end. While the angle can vary widely, generally drum 40 will form an acute angle with a horizontal line no greater than about 45° and typically less than 15°. Preferably, the angle is less than 5°.

In the preferred embodiment, the media charging end of container 40 is lowered. When the media charging end of container 40 is lowered, condensate is discharged at the lower end of container 40 through openings that allow the condensate to pass freely through but that prevent the media from passing. When the media charging end of container 40 is elevated, the cold media is discharged at the lower end of container 40 through means that allow the media to pass freely through but that prevent the condensate from passing through.

Removed condensate leaves drum 40 through screen 52.

The exhaust gases from the curing oven generally are gases from the curing of phenolic resinous condensation products. In the examples of this invention, the exhaust gases are from the curing of bonded glass fiber structures coated with phenolic resinous condensation products. Generally, these exhaust gases have a temperature ranging from 350° to 650° F., preferably from 500° to 650° F.

The hot combustion gases introduced into the intermediate portion of the bed must be hot enough to incinerate the curing oven gases. Generally, the hot gases have a temperature ranging from 700° to 1400° F., preferably 1000° to 1400° F. In the examples of this invention, the hot gases have a temperature of 1350° F. The hot gases may be the exhaust gases from a glass melting furnace. However, preferably, they are the combustion products of an external burner.

The following examples further illustrate this invention.

EXAMPLE I

The reactor is a cylinder located on a conical bottom to facilitate the movement of solids. The cylinder is 3 feet in diameter and 6 feet long. The bottom is a 45 degree cone. The hot burner air (at about 1450 degrees F.) and waste gases (at 400 degrees F.) enter through a co-axial tube (10 inches and 7 inches in diameter respectively). The hot burner air simulates the source of heat and waste gases at 400° F. to simulate oven exhaust gases. The burner air discharges at 3 feet from the top, and the waste gases discharge at 6 feet from the top. Thus, the reactor is divided in three zones; namely, a preheat zone, incineration zone and a heat recovery zone.

The moving media is 1 inch diameter solid alumina balls. It is recycled to the top of the reactor hopper with a bucket elevator. A screw feeder at the conical bottom meters/controls the media recycle rate. The media recycle rate was varied between 5000 lb/hr to 20,000 lb/hr.

In the preheat zone, as the oven gases to be incinerated rise, they are heated by the moving solids from the top. At 3 feet from the top, the oven gases intermix with burner gases, the flow of which is sufficient to complete the heating of these gases to about 1300° F. The incineration occurs at this temperature. In the heat recovery zone, the hot gases meet the cold solids moving down from the top and, therby, discharge most of their heat.

Phenol was used to simulate the binder contained in the exhaust gases from the curing ovens. The phenol was injected as a vapor at about 350° F. into the duct carrying the simulated oven waste gases. The phenol in the vapor form was easily dispersed in the air stream in the duct at the rate of 5 cc/minute. The air stream was sampled and analyzed by Method No. S330 of National Institute of Occupational Safety and Health (NIOSH) for phenol. This method involved bubbling a known sample of air containing the phenol to be analyzed through dilute sodium hydroxide and then GC (Gas Chromatograph) analysis of the collected sample after acidification with sulfuric acid. A portable organic vapor analyzer (Foxboro Model OVA-128) was also used to monitor the organic concentration during the trials.

Thermocouples were inserted from the side and top of the reactor. The hot zone is concentrated about half way between the inlet for burner gases and the inlet for waste gases.

The operating results are shown in the Table. The column "burner temperature" is the temperature of the hot air as it leaves the burner. This is the air which provides the energy required to heat the oven exhaust gases to the incineration temperature. It was not possible to determine the temperature of burner air as it entered the moving bed.

The "percent of energy saved" column is calculated to show the extent of saving in energy from the present practice in the plants to exhaust the gases (after phenol has been destroyed) at the burnoff temperature (about 1310° F.). In the present system, the gases are exhausted to the atmosphere at about 700 degrees F. The rest of the energy is recovered in heating the media. In essence, the waste gases are heated from 400 degrees F. to about 700 degrees F. Therefore, the savings are about 67 percent.

The column headings with respect to phenol concentration and conversion are self-explanatory. The experiments were conducted in the order higher temperature to lower temperature. Phenol was completely destroyed at higher temperature. As the temperature is decreased, the destruction efficiency decreases, as is evident in the Table.

The dwell time of 0.1 seconds is much lower than in the conventional incinerator. The media provide sufficient mixing as well as high surface area for an efficient heat transfer which cuts the required dwell time for incineration. In a conventional incinerator, the required dwell time is 0.5 seconds, a major part of which is to complete the heat transfer to achieve the incineration temperature. Once the incineration temperature is achieved, the time required for actual incineration is very small—less than 0.2 second.

TABLE

| | | OPERATING RESULTS | | | |
|---|---|---|---|---|---|
| Burner Temp °F. | Bed Temp °F. | % Energy Saved | Inlet Phenol Conc. PPM | Outlet Phenol Conc. PPM | % Phenol Destruction |
| 1600 | 1395 | 64 | 69 | 0.4 | 99+ |
| 1450 | 1380 | 65 | 58 | 0.4 | 99+ |
| 1400 | 1310 | 67 | 58 | 1.0 | 98 |
| 1350 | 1180 | 72 | 56 | 11.0 | 80 |

The data demonstrate a phenol destruction efficiency ranging from 80% to in excess of 99%. The energy requirements are about 67% less than a conventional fume incinerator without heat recovery of any form. The dwell time also is much lower than in a conventional incinerator.

INDUSTRIAL APPLICABILITY

Rotary processes have been used extensively in producing fibers, such as glass fibers, wherein the spinner is usually disposed for rotation about a vertical axis and the streams of glass, centrifuged from the spinner, engaged by a vertically downwardly directed annular gaseous blast for attenuating the centrifuged streams to fibers and the fibers collected upon a moving conveyor wherein the fibers are impinged generally vertically onto the conveyor. In such processes, the vertically moving fibers are collected in random disposition in a mass upon the conveyor. The mass of fibers is processed into a mat and then converted to wool insulation.

Another method that has been used in forming fibers from heat-softenable material, such as glass, involves attenuating primary filaments from streams of heat-softened glass and feeding the primary filaments into horizontally directed attenuating blasts of intensely-hot high-velocity gases of combustion from combustion burners and collecting the blast-attenuated fibers upon a substantially horizontal conveyor or collecting surface. The fibers are attenuated by the burner-blast method and collected on a horizontal surface and processed into a mat.

Use of any particular type of binder may be employed with the blowing wool of this invention. Any binder suitable for bonding glass fibers together in batt or mat form can be used with glass fibers to form the bonded glass fiber material which is cut into lengths suitable for use as blowing wool. Examples of such binders are reaction products of the phenols, cresols, resorcinols and their derivatives, and the like, with an aldehyde; reaction products of nitrogeneous resin forming compounds, such as urea and melamine, with an aldehyde, such as formaldehyde; and other condensation reaction products of furfuryl alcohol, furfural, aniline and the like.

Densities of glass fiber material in the range of about 0.2 to 20 pounds per cubic foot may be used in this invention. Preferably, the cured wool has a density ranging from 0.4 lb/ft$^3$ to 1.0 lb/ft$^3$. Binder, preferably phenol formaldehyde containing 20% of less of urea, should represent 3.0 to 5.0% by weight of the blanket material. Fiber blanket contain binder must be cured in an oven. The oven exhaust contain fumes which may require incineration by this method.

We claim:

1. A process for cleaning and incinerating exhaust gases from a curing oven including the steps of
    forming and maintaining a vertical, packed bed of durable heat transfer media,
    discharging exhaust gases from the curing oven into the lower central portion of the bed and moving the gases upwardly through the bed,
    discharging hot gases into the intermediate central portion of the bed and moving the gases upwardly through the bed, the hot gases incinerating any particulate or condensate in the exhaust gases from the curing oven,
    moving the media downwardly and in direct contact with and countercurrently to the flow of gases wherein the direct contact media with the gases and in the lower portion the hot media preheats incoming fume gases and in the upper portion the hot gases preheat the incoming cool media, and
    removing the gases that pass through the top portion of the packed bed.

2. A process according to claim 1 wherein the hot gases introduced into the intermediate portion of the bed have a temperature ranging from 1000° to 1400° F.

3. A process for cleaning and incinerating exhaust gases from a curing oven including the steps of
    forming and maintaining a vertical, packed bed of durable heat transfer media
    discharging exhaust gases from a curing oven into the lower central portion of the bed and moving the gases upwardly through the bed,
    discharging hot gases into the intermediate central portion of the bed and moving the gases upwardly through the bed, the hot gases incinerating any particulate or condensate in the exhaust gases from the curing oven,
    moving the media downwardly and in direct contact with and countercurrently to the flow of gases wherein the direct contact of the media with the gases coats the media with a condensate in the bed, and
    removing the gases that pass through the top portion of the packed bed.

4. A process according to claim 2 including the additional steps of:
    removing coated media from the lower part of the vertical, packed bed,
    introducing the hot, coated media into a cleaning container, and
    rotating the cleaning container, during rotation the media tumbling and moving over each other in cleaning relationship to remove the coating from the media by abrasion of the media against each other.

5. A process according to claim 4 including the step of inclining the cleaning container.

6. A process according to claim 5 including the step of removing cleaned media from the elevated end of the inclined container.

7. A process according to claim 5 including the step of discharging removed condensate at the lower end of the inclined cleaning container through openings that allow the condensate to pass freely through but that prevent the media from passing.

8. A process according to claim 4 including the step of removing the cleaned media from the container and recycling the cleaned media to step of forming a vertical packed bed of media.

9. A process according to claim 2 wherein the exhaust gases from the curing oven are gases from the curing of phenolic resinous condensation products.

10. A process according to claim 2 wherein the exhaust gases from the curing oven are gases from the curing of bonded glass fiber structures coated with phenolic resinous condensation products.

11. A process according to claim 2 wherein the exhaust gases from the curing oven have a temperature ranging from 350° F. to 650° F.

12. A process according to claim 2 wherein the exhaust gases from the curing oven have a temperature ranging from 500° to 650° F.

13. A process according to claim 2 wherein the hot gases introduced into the intermediate portion of the bed have a temperature ranging from 700° to 1400° F.

14. A process according to claim 3 wherein the hot gases introduced into the intermediate portion of the bed have a temperature of 1350° F.

* * * * *